United States Patent [19]

Persson et al.

[11] Patent Number: 5,365,850
[45] Date of Patent: Nov. 22, 1994

[54] IGNITING DEVICE

[75] Inventors: Torsten Persson; Staffan Calsson, both of Karlskoga, Sweden

[73] Assignee: Autoliv Development AB, Vargarda, Sweden

[21] Appl. No.: 66,176

[22] Filed: Jun. 11, 1993

[30] Foreign Application Priority Data

Sep. 30, 1991 [SE] Sweden ............................ 9102826-6

[51] Int. Cl.⁵ ............................................ F42C 1/04
[52] U.S. Cl. ........................... 102/272; 102/275.11; 280/734
[58] Field of Search ........... 102/272, 273, 275, 275.11, 102/204, 216; 280/734, 735

[56] References Cited

U.S. PATENT DOCUMENTS

| | | | |
|---|---|---|---|
| 3,888,182 | 6/1975 | Breed | 102/272 |
| 3,968,980 | 7/1976 | Hay | 280/734 |
| 4,161,228 | 7/1979 | Svensson et al. | 280/734 |
| 4,966,388 | 10/1990 | Warner et al. | 280/734 |
| 4,982,664 | 1/1991 | Norton | 102/272 |

FOREIGN PATENT DOCUMENTS 363011 7/1981 Austria .
247741 1/1948 Switzerland .

*Primary Examiner*—David Brown
*Attorney, Agent, or Firm*—Spencer, Frank & Schneider

[57] ABSTRACT

A method and an arrangement to determine the lowest speed at which an activating pin activates a detonator, this being achieved by a hydraulic medium, the viscous property of which is used to control the transfer of energy from the activating pin to the detonator.

8 Claims, 3 Drawing Sheets

IGNITING DEVICE

BACKGROUND OF THE INVENTION

The present invention relates to a method whereby the activation of a detonator device intended for pyrotechnic charges, activated by a percussion pin, and comprising a percussion detonator cap and a percussion pin displaceable against the latter by external action, is made dependent on a minimum speed of displacement of the percussion pin. The invention thus relates to predetermining the minimum speed required for the percussion pin to activate the percussion detonator cap. The invention also relates to a device constructed in accordance with the principle of the invention.

There is a need, in certain technical applications, inter alia for speed sensors, to be able to predetermine the minimum speed at which a percussion pin will activate a percussion detonator cap against which it is moved, i.e., the speed of the percussion pin is required to control the energy transmission to the percussion detonator cap so that a low speed gives little energy transmission, i.e., no activation of the percussion detonator cap, while a speed in excess of a predetermined value gives an energy transmission which guarantees activation of the percussion detonator cap.

SUMMARY OF THE INVENTION

The method and arrangement according to the invention are specially adapted to control the speed relationship of percussion pin activated detonator devices of the type which are expected to be exposed to considerable impact energy but with which the speed of impact may vary considerably. A specific technical area of this kind which is increasingly topical is the activation of crash protection for motor vehicle passengers, of the airbag type, in which the displacement of the percussion pin, for example, can be rendered dependent upon the vehicle deformation. Thus the invention can more particularly be utilised for lateral crash protection, in which the release of the percussion pin, for example, can be made dependent on the deformation of a vehicle door, and in which it must be considered desirable that the crash protection should not be triggered in the event of deformation of the door in question at the absolute minimum speed. On the other hand, crash protection must be initiated faultlessly at speeds such as may be expected to cause personal injury. A specific characteristic which may always be expected in connection with vehicle crash injuries is that the impact energy is always considerable while the speed may vary within wide ranges.

According to the invention, the viscous property of a hydraulic medium is utilised to control the energy transmission between the percussion pin and the percussion detonator cap. This involves disposing the hydraulic medium between the displaceable percussion pin and the percussion detonator cap or alternatively between a displaceable percussion detonator cap and a fixed abutment and simultaneously giving the hydraulic medium the opportunity to leave this position via a constriction adapted to the viscosity of the medium. By adapting the hydraulic medium and the constriction to one another, it is possible to achieve the condition that a percussion pin moved slowly in the direction of the percussion detonator cap or alternatively a percussion detonator cap moved by the percussion pin slowly in the direction of a fixed abutment will force the hydraulic medium away through a constriction without the percussion detonator cap being activated while a percussion pin displaced more rapidly will move too quickly for the hydraulic medium to be able to escape through the constriction and hence the energy transmission will take place with the hydraulic medium as an intermediate member, resulting in activation of the percussion detonator cap. Technically, this therefore means that in the event of an increased impact speed of the percussion pin the hydraulic flow through the constriction will be time-critical and the abutment will increase in energy terms against the percussion detonator cap which, at a speed above the preset value, results in activation of the cap.

By adapting the constriction and choice of hydraulic medium to one another, it is therefore possible to determine very accurately the detonation speed required of the sensor.

The invention can therefore be defined as a method and arrangement whereby, in detonator devices for pyrotechnic charges of the type comprising a percussion detonator cap and a percussion pin displaceable against the same, or alternatively a percussion detonator cap displaceable by the percussion pin, the activation of the detonator device is made dependent on a predetermined minimum speed of displacement of the percussion pin. The characterising feature of the invention is that a deformable hydraulic and at least substantially non-compressible medium is disposed in a first cavity adapted to the purpose between the percussion pin and the percussion detonator cap or alternatively between the latter and a fixed abutment. The first cavity then communicates via a constriction with a second initially empty cavity, the hydraulic medium can be forced away when the percussion pin is displaced against the percussion detonator cap, the constriction being so adapted to the viscosity of the hydraulic medium that the latter, when the percussion pin is displaced with at least the predetermined minimum speed, will not be forced through the constriction in time with the percussion pin movement but instead will transmit a sufficient quantity of energy to the percussion detonator cap to activate the same.

The hydraulic medium may, for example, be a soft metal such as lead or a lead alloy and in that case the said first and second cavities can be given a very simple configuration. The first cavity is quite simply the cavity in front of the percussion pin which faces the percussion detonator cap and the second cavity and the constriction comprise a borehole formed in the percussion pin with an accurately adapted diameter.

To ensure that the percussion pin will not activate the percussion detonator cap in the event of a slow displacement, the percussion pin should be given a length such that it quite simply requires a certain quantity of hydraulic medium in front of it to reach the percussion detonator cap.

The percussion detonator cap is advantageously a cap of stock construction and the pyrotechnic composition of the detonator material can be so controlled that a certain predetermined effect is required per unit volume to result in detonation in a given predetermined speed range.

Apart from lead and lead alloys, numerous organic and inorganic materials can be used as hydraulic medium provided that the relationship between the flow properties of the medium and the constriction is adapted in the manner indicated.

It was stated above that the second cavity into which the hydraulic medium can be forced on slow movements of the percussion pin can be disposed in the actual percussion pin itself. Of course, this cavity can also be situated at the side of the percussion pin or in one part of a percussion pin divided into at least two pairs in cases in which the hydraulic medium is disposed between the parts.

How the percussion pin gives its movement in the direction towards the percussion detonator cap is irrelevant to this context, but it can be done, for example, by a deformation produced by external forces. The invention will now be described in greater detail with reference to the accompanying drawings wherein:

DETAILED DESCRIPTION OF THE PREFERRED EMBODIMENTS

Figure 1:
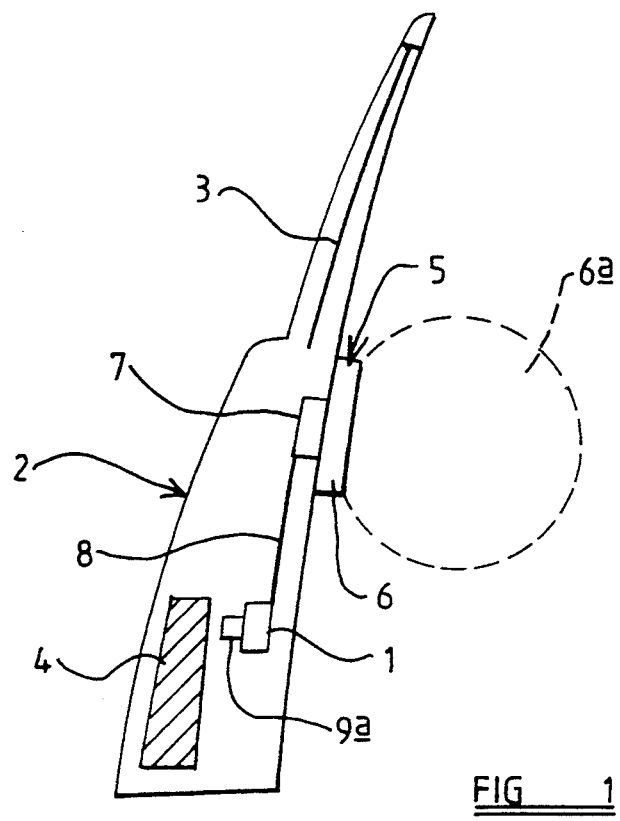
FIG. 1 is a cross-section through a motor vehicle door.

FIG. 1 illustrates a practical application of a detonator device according to the invention. The detonator device 1 is mounted in a motor vehicle door 2, the window part of which is denoted by reference 3. The door 2 contains a crash protection in the form of a beam 4. On the inside of the door is an airbag unit 5. This comprises an inflatable air cushion 6. The inflated position has been denoted by reference 6a. The system also includes a gas generator 7 for instantaneous inflation of the airbag 6. The gas generator is connected to the detonator 1 via a short fuse 8, for example of the shock cord type.

In the event of another vehicle being driven into the vehicle containing the door 2, and meeting the door 2 from the side, the crash protection beam 4 will be shifted towards the detonator 1 and then, in accordance with the principle of the invention, the detonator will only activate the short fuse 8 if damage occurs so quickly that personal injury can in all probability be expected. In such cases, the airbag 6 will be filled and prevent the passenger or driver sitting next to the door 2 from being thrown against the latter and injured there.

In FIG. 1, reference 9a denotes the projecting percussion pin of the detonator, such pin coming into contact with the crash protection beam 4 in the event of deformation of the door.

Figure 2:
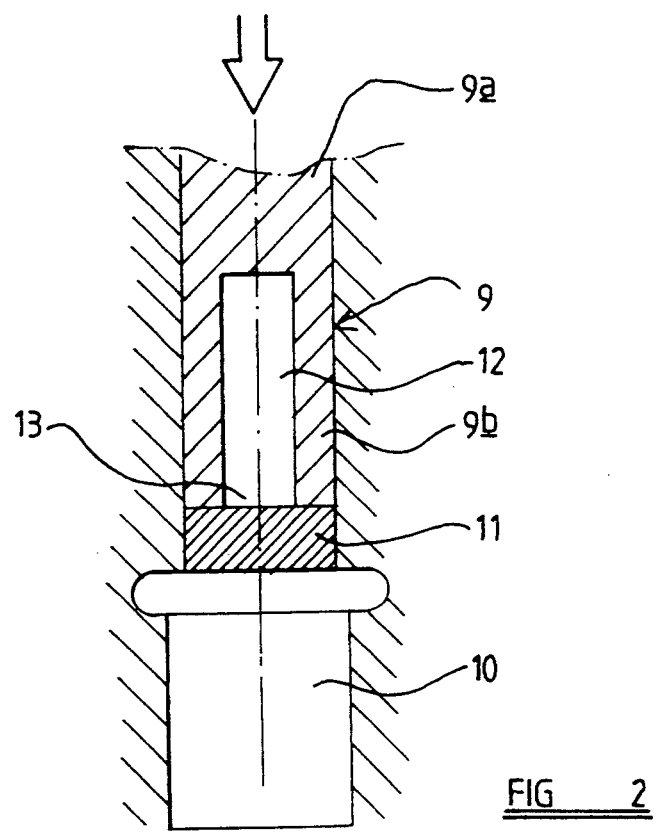
FIGS. 2 to 5 are cross-sections through the actual detonating functional parts in various detonator devices constructed in accordance with the invention.

Reference will now be made to FIG. 2, which shows the percussion pin 9, its above-mentioned projecting part 9a and its inner part 9b which faces a percussion detonator cap 10. A hydraulic medium 11 is provided between the cap 10 and the inner part 9b of the percussion pin. In the example illustrated, the hydraulic medium is lead or some other suitable deformable viscous but substantially non-compressible medium. At its end 9b facing the hydraulic medium, the percussion pin 9 is provided with a borehole 12, the opening of which facing the lead 11 forms a constriction 13 through which the lead can be completely or partially pressed and into the cavity 12 formed by the borehole.

If the crash protection beam 4 is subjected to deformation at a very slow rate, for example when the crashing vehicle has practically completely lost its speed, then the percussion pin 9 will be displaced at the same slow rate and hence the lead 11 will be successively forced into the borehole 12 via the constriction 13, and this in turn means that there will be no appreciable energy transmission to the percussion detonator cap 10, i.e., the detonator will not be triggered despite the fact that the percussion pin has been displaced to the maximum. Advantageously, to ensure its function, the percussion pin is given a length such that it can never trigger the cap without the hydraulic medium as an intermediate member and energy transmitting means.

If, on the other hand, the door is driven into and is subjected to deformation at a much greater speed, the lead 11 will not be forced into the borehole 12 but will instead transmit a sufficient quantity of energy to the detonator cap, which is activated and in turn ignites the short fuse 8, which ignites the gas generator 7, which inflates the airbag 5, 6a, which in turn is pushed away and receives the passenger or driver sitting next to the door.

Figure 3:
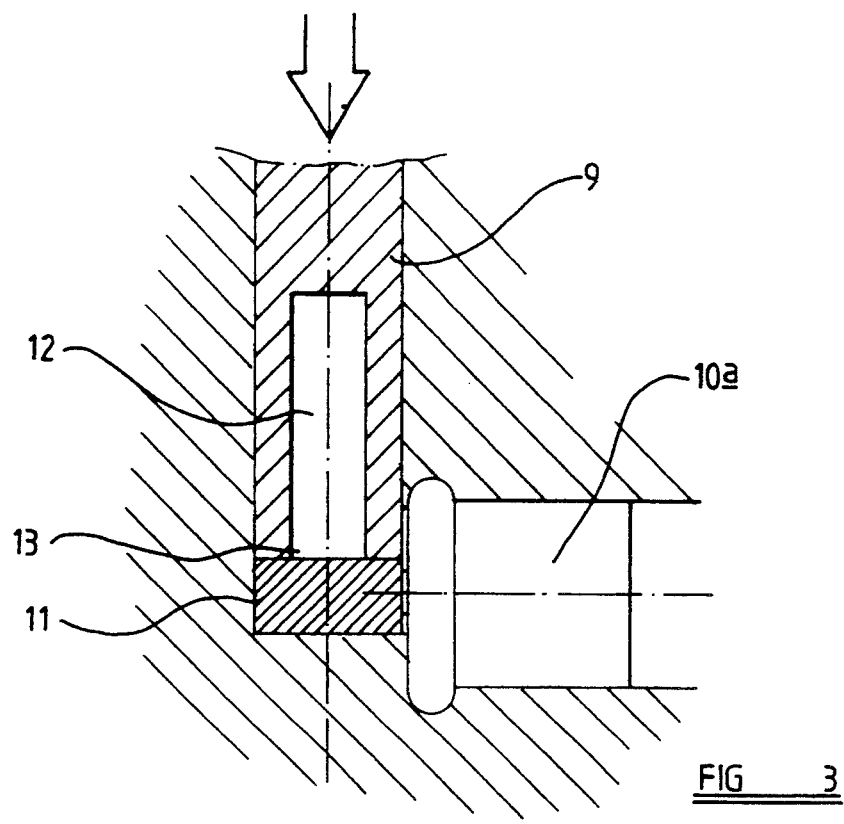

FIG. 3 shows in principle the same detonator as FIG. 2 but with the modification that the detonator cap is disposed at an angle to the percussion pin. This is permissible since when the percussion pin presses against the lead 11 the latter will creep in all available directions, i.e. partly into the borehole 12 and partly in the direction of the detonator cap 10a in this case. Given adequately devised hardness of the lead relatively to the diameter of the borehole 12, the cap 10a is again activated in this case given an adequately fast rate.

Figure 4:
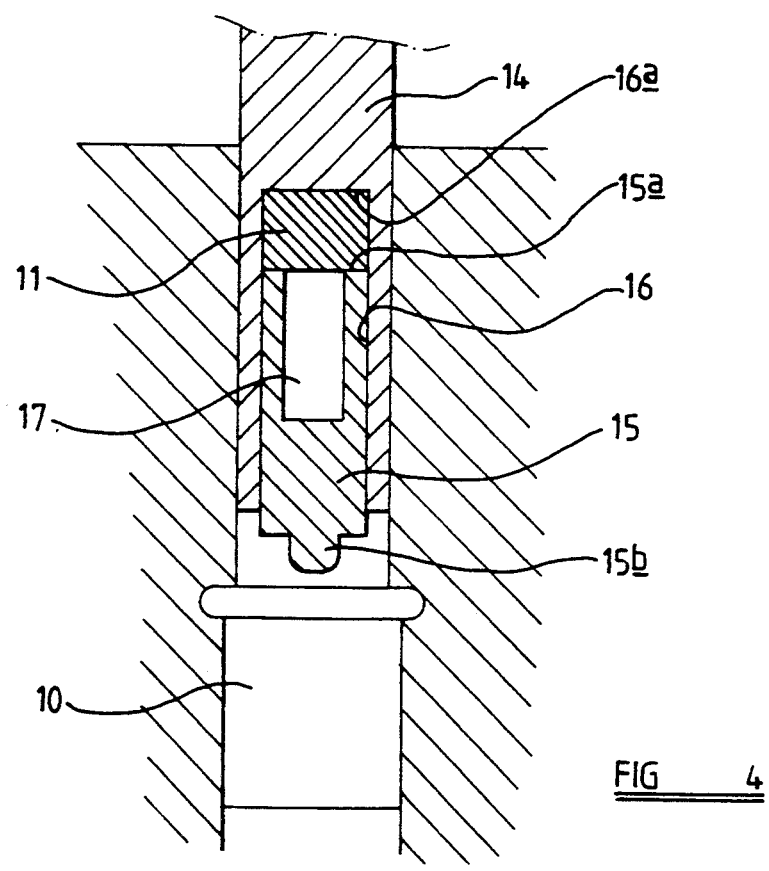

Finally, FIG. 4 relates to identical operation but in this case the percussion pin is divided up into two parts 14 and 15, movable one inside the other. The part 14 thus contains a borehole 16 in which the part 15 is movable while the part 15 contains a borehole 17 which, in the case of a slow rate, can receive the lead 11 disposed between the outer end 15a of the part 15 and the bottom 16a of the borehole 16 in the part 14. In addition, the part 15 has an abutment end 15b facing the detonator cap 10, such end 15b being displaced towards and activating the cap 10 in the event of a fast rate.

Figure 5:
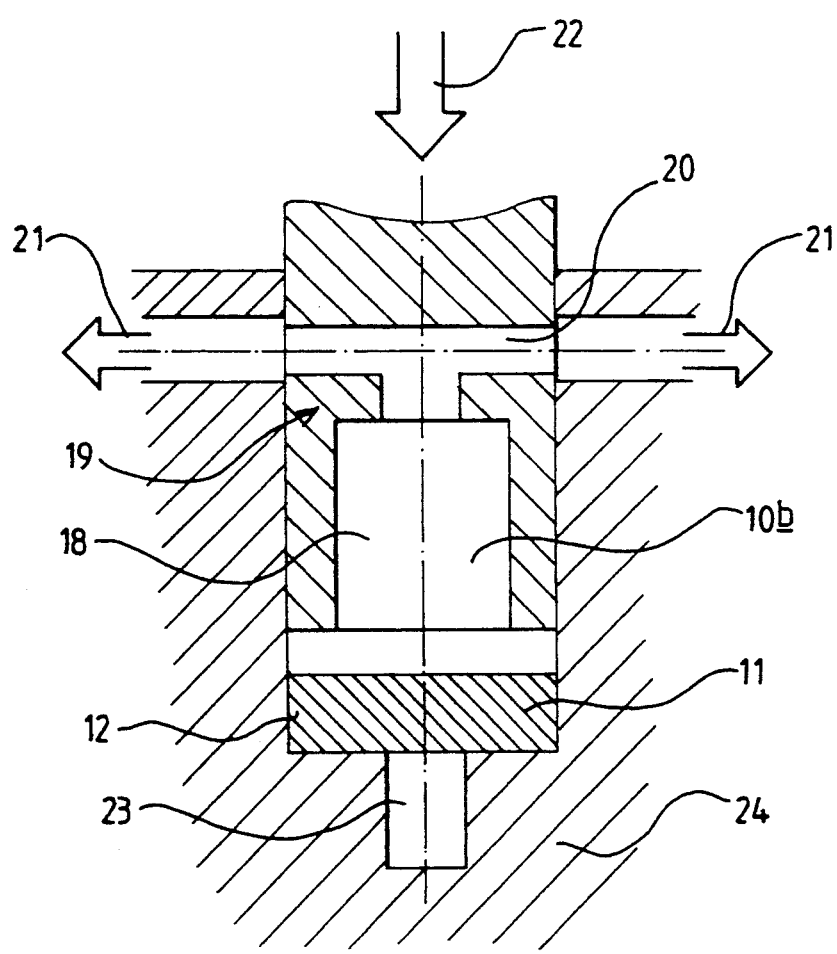

FIG. 5 shows another variant in which the detonator cap 10b is disposed in a borehole 18 in a movable percussion pin 19. The borehole 18 is continued in the form of a T-shaped detonator duct 20 which conveys the detonation pulse 21 from the cap 10b to the charge for activation.

The crash force possibly acting on the percussion pin 19 is denoted by reference 22 in the drawing. In this variant, it is therefore the detonator cap 10b which is moved towards the hydraulic medium 11 by the percussion pin 19. The other space to which the hydraulic medium can be moved at a slow rate comprises a borehole denoted by reference 23 in the fixed body 24 in which the percussion pin is displaceable. Otherwise the operation is identical to the above-described alternatives.

We claim:
1. Method of detonating a pyrotechnic charge, comprising the steps of:
   displacing a percussion pin at a speed;
   controlling a transfer of energy from the percussion pin to a percussion detonator cap using a substantially non-compressible deformable hydraulic medium disposed in a first cavity, the first cavity being connected via a constriction to a second cavity for receiving the medium when the percussion pin is displaced below a predetermined minimum speed, the constriction being dimensioned to prevent a substantial flow of the medium into the second cavity through the constriction when the percussion pin is displaced at at least a predetermined minimum speed;

transmitting energy from the percussion pin to the percussion detonator cap when the percussion pin is displaced at at least the predetermined minimum speed; and activating the percussion detonator cap when the percussion pin is displaced at at least the predetermined minimum speed.

2. A detonator device for pyrotechnic charges, comprising:

a percussion detonator cap;

a displacable percussion pin for activating said percussion detonator cap when said percussion pin is displaced at at least a predetermined speed; and control means for controlling a transfer of energy from said percussion pin to said percussion detonator cap, said control means comprising a substantially non-compressible deformable hydraulic medium disposed in a first cavity, the first cavity being connected via a constriction to a second cavity, the constriction being dimensioned to permit the medium to pass therethrough into the second cavity when said percussion pin is displaced below the predetermined speed and being dimensioned to prevent a substantial flow of the medium into the second cavity when said percussion pin is displaced at at least the predetermined minimum speed so that energy from the percussion pin is transmitted to the percussion detonator cap thereby to activate the percussion detonator cap.

3. A detonator device as defined in claim 2, wherein the hydraulic medium comprises at least one of viscous lead and viscous lead alloy.

4. A detonator device as defined in claim 2, wherein the second cavity comprises a borehole within said percussion pin opening directly towards the hydraulic medium, and wherein the hydraulic medium abuts said percussion detonator cap.

5. A detonator device as defined in claim 2, wherein said percussion pin comprises a first part and a second part, said first part abutting said percussion detonator cap and said second part being exposed to external action for displacement of said percussion pin, one of said parts being displacably located within the other of said parts, the hydraulic medium being disposed between said first and second parts, and the second cavity being formed within one of said parts.

6. A detonator device as defined in claim 2, wherein the constriction forms an integral part of the second cavity, and the second cavity and the constriction have the same cross sectional area.

7. A detonator device as defined in claim 2, wherein said hydraulic medium acts as an intermediate member for allowing said percussion pin to reach said percussion detonator cap.

8. A detonator device as defined in claim 2, further comprising a fixed part for accommodating said displacable percussion pin and having the first and second cavities formed therein, said percussion detonator cap being mounted in a bore hole within said percussion pin and being displacable towards the first cavity.

* * * * *